(12) United States Patent
Kito et al.

(10) Patent No.: US 10,190,671 B2
(45) Date of Patent: Jan. 29, 2019

(54) VEHICLE DRIVE DEVICE

(71) Applicant: AISIN AW CO., LTD., Anjo-shi, Aichi-ken (JP)

(72) Inventors: Masashi Kito, Anjo (JP); Taisuke Fukui, Gamagori (JP); Osamu Murai, Toyota (JP)

(73) Assignee: AISIN AW CO., LTD., Anjo (JP)

( * ) Notice: Subject to any disclaimer, the term of this patent is extended or adjusted under 35 U.S.C. 154(b) by 205 days.

(21) Appl. No.: 14/917,454

(22) PCT Filed: Sep. 30, 2014

(86) PCT No.: PCT/JP2014/076177
§ 371 (c)(1),
(2) Date: Mar. 8, 2016

(87) PCT Pub. No.: WO2015/046592
PCT Pub. Date: Apr. 2, 2015

(65) Prior Publication Data
US 2016/0223070 A1    Aug. 4, 2016

(30) Foreign Application Priority Data

Sep. 30, 2013  (JP) .................................. 2013-204926

(51) Int. Cl.
*F16H 57/04* (2010.01)
*B60K 6/40* (2007.10)
*B60K 6/54* (2007.10)
*F04C 11/00* (2006.01)
*F01C 21/00* (2006.01)
(Continued)

(52) U.S. Cl.
CPC .......... *F16H 57/0441* (2013.01); *B60K 6/40* (2013.01); *B60K 6/54* (2013.01); *F01C 21/007* (2013.01); *F04C 11/005* (2013.01); *F04C 15/06* (2013.01); *F16H 57/0436* (2013.01); *B60Y 2200/92* (2013.01); *B60Y 2300/182* (2013.01); *B60Y 2300/45* (2013.01); *B60Y 2306/03* (2013.01); *B60Y 2400/785* (2013.01); *B60Y 2400/87* (2013.01); *F04C 2/10* (2013.01);
(Continued)

(58) Field of Classification Search
CPC ... F16H 57/0441; F16H 57/0436; B60K 6/40; B60K 6/54; F01C 21/007; F04C 11/005; F04C 15/06
See application file for complete search history.

(56) References Cited

U.S. PATENT DOCUMENTS

| 5,474,428 A | 12/1995 | Kimura et al. |
| 6,941,922 B2 * | 9/2005 | Williams ................. F01M 1/02 |
| | | 123/196 R |

(Continued)

FOREIGN PATENT DOCUMENTS

| DE | 102011079822 A1 | 1/2013 |
| GB | 2035456 A | 6/1980 |

(Continued)

*Primary Examiner* — Michael A Riegelman
(74) *Attorney, Agent, or Firm* — Oliff PLC (57) ABSTRACT

A vehicle drive device that includes a mechanical oil pump that is driven by a driving force source for a wheel; an auxiliary oil pressure source; a driving force transmission mechanism that transmits a driving force between the driving force source and the wheel; and a case that accommodates at least the driving force transmission mechanism.

14 Claims, 6 Drawing Sheets

(51) Int. Cl.
  *F04C 15/06* (2006.01)
  *F04C 2/10* (2006.01)
  *F16H 57/02* (2012.01)
  *F04C 2/344* (2006.01)

(52) U.S. Cl.
  CPC .............. *F04C 2/344* (2013.01); *F16H 57/02* (2013.01); *Y10S 903/917* (2013.01)

(56) References Cited

U.S. PATENT DOCUMENTS

| | | | |
|---|---|---|---|
| 9,878,605 B2 * | 1/2018 | Inoue | B60K 6/22 |
| 2002/0060099 A1 * | 5/2002 | Takenaka | B60K 6/365 |
| | | | 180/65.1 |
| 2005/0187066 A1 * | 8/2005 | Moses | B60K 6/383 |
| | | | 477/2 |
| 2006/0054445 A1 * | 3/2006 | Pashnik | B60K 6/40 |
| | | | 192/113.1 |
| 2008/0108469 A1 | 5/2008 | Weinschenker et al. | |
| 2010/0242669 A1 | 9/2010 | Komizo et al. | |
| 2011/0298314 A1 | 12/2011 | Atarashi et al. | |
| 2012/0082570 A1 * | 4/2012 | Schultz | F16H 61/0028 |
| | | | 417/212 |
| 2012/0128513 A1 * | 5/2012 | Sakata | F04C 2/086 |
| | | | 417/410.1 |
| 2015/0057858 A1 * | 2/2015 | Nitta | F01M 1/02 |
| | | | 701/22 |
| 2016/0003245 A1 * | 1/2016 | Ike | F16H 61/0025 |
| | | | 417/362 |
| 2016/0176392 A1 * | 6/2016 | Murata | B60K 6/445 |
| | | | 701/22 |
| 2016/0281842 A1 * | 9/2016 | Fukui | F16H 57/0439 |
| 2017/0219085 A1 * | 8/2017 | Kiyokami | F16H 57/0413 |

FOREIGN PATENT DOCUMENTS

| | | |
|---|---|---|
| JP | H06-174055 A | 6/1994 |
| JP | 2002-195377 A | 7/2002 |
| JP | 2009-243482 A | 10/2009 |
| JP | 2010-158975 A | 7/2010 |
| JP | 2010-236581 A | 10/2010 |
| JP | 2010-270859 A | 12/2010 |
| JP | 2011-259590 A | 12/2011 |
| JP | 2012-057675 A | 3/2012 |
| JP | 2013062501 * | 3/2013 |

* cited by examiner

VEHICLE DRIVE DEVICE

BACKGROUND

The present disclosure relates to vehicle drive devices including a mechanical oil pump that is driven by a driving force source for wheels, an auxiliary oil pressure source, a driving force transmission mechanism that transmits a driving force between the driving force source and the wheels, and a case that contains at least the driving force transmission mechanism.

In recent years, an increasing number of vehicles that have an idle stop function to stop an internal combustion engine when the vehicle is stopped have been developed in order to reduce fuel consumption and exhaust gas emissions. Hybrid vehicles having both an internal combustion engine and a rotating electrical machine as driving force sources typically have a function to stop the internal combustion engine when the vehicle is decelerated in addition to when the vehicle is stopped. However, in vehicles having a hydraulically driven shift device, a mechanical oil pump that is driven by an internal combustion engine is also stopped when the internal combustion engine is stopped. In this case, oil supply to the shift device is stopped unless there is other oil pressure supplier. The shift device therefore may not be able to be appropriately operated. As a solution, a configuration is proposed which includes an electric oil pump as an auxiliary oil pressure source in addition to the mechanical oil pump so that oil discharged from the electric oil pump is supplied to the shift device when an internal combustion engine is stopped.

For example, Japanese Patent Application Publication No. 2010-236581 discloses a vehicle drive device having such a configuration. As is also disclosed in Japanese Patent Application Publication No. 2010-236581, the electric oil pump is typically attached to the outside of the case of the vehicle drive device. However, in the case where the electric oil pump is attached to the outside of the case of the vehicle drive device, it is necessary to provide dedicated oil passages for the electric oil pump which extend across the case to the outside of the case like a suction connection oil passage that supplies oil to the electric oil pump and a discharge connection oil passage that supplies oil discharged from the electric oil pump to the shift device etc. (a speed change mechanism). This complicates the overall oil passage configuration of the vehicle drive device.

The electric oil pump can be accommodated in the case of the vehicle drive device to simplify the overall oil passage configuration of the vehicle drive device. However, since the internal space of the case of the vehicle drive device is usually limited in size, squeezing the electric oil pump into the case of the vehicle drive device without taking into consideration the position of the electric oil pump in the case of the vehicle drive device can result in an increase in overall size of the device.

Japanese Patent Application Publication No. 2010-158975 discloses, as an example of a technique of simplifying oil passages of an electric oil pump and a mechanical oil pump, a technique of coupling a mechanical oil pump and an electric oil pump together by an oil passage formation block member having a common suction port and a common discharge port so as to provide a common oil passage for the mechanical oil pump and the electric oil pump. However, Japanese Patent Application Publication No. 2010-158975 does not take into consideration the position of the electric oil pump in the case of the vehicle drive device.

SUMMARY

It is desired to implement a vehicle drive device in which an auxiliary oil pressure source together with a mechanical oil pump can be efficiently placed in a case of a vehicle drive device.

According to the present disclosure, a vehicle drive device includes a mechanical oil pump that is driven by a driving force source for a wheel, an auxiliary oil pressure source, a driving force transmission mechanism that transmits a driving force between the driving force source and the wheel, and a case that accommodates at least the driving force transmission mechanism, wherein the mechanical oil pump includes a mechanical pump rotor and a mechanical pump housing forming a pump chamber that accommodates the mechanical pump rotor, the auxiliary oil pressure source includes an auxiliary oil pressure generation mechanism that generates an auxiliary oil pressure, and an auxiliary oil pressure source housing that accommodates the auxiliary oil pressure generation mechanism, the mechanical pump housing is attached to a wall in the case, and the auxiliary oil pressure source housing is attached to the mechanical pump housing.

According to this characteristic configuration, the auxiliary oil pressure source housing is attached to the mechanical pump housing attached to the wall in the case. That is, the auxiliary oil pressure source is attached to the wall in the case via the mechanical oil pump. Accordingly, no attachment portion for attaching the auxiliary hydraulic pressure source needs to be provided on the wall in the case, which can suppress complication of the structure of the case and the structure in the case.

It is preferable that the mechanical pump housing include a first attachment surface that faces an axial first direction side or one side in an axial direction of a mechanical pump axis as a rotation axis of the mechanical pump rotor, and a second attachment surface that faces an axial second direction side in an opposite direction to the axial first direction, the mechanical pump housing be attached to the case such that the first attachment surface contacts the wall, and the auxiliary oil pressure source housing be attached to the mechanical pump housing such that the auxiliary oil pressure source housing contacts the second attachment surface.

According to this configuration, the auxiliary oil pressure source is attached to the wall in the case via the mechanical oil pump. The case, the mechanical pump housing, and the auxiliary oil pressure source housing are disposed in this order from the axial first direction side toward the axial second direction side in the axial direction. This allows a region where the mechanical pump housing is placed and a region where the auxiliary oil pressure source housing is placed to overlap each other as viewed in the axial direction, whereby the auxiliary oil pressure source housing can be easily attached to the mechanical pump housing. As a result, especially a space adjoining the mechanical oil pump in the axial direction in the case can be effectively used as compared to the case where the auxiliary oil pressure source and the mechanical oil pump are disposed side by side along the wall in the case. This can suppress an increase in size of the case in the direction perpendicular to the axial direction.

It is preferable that the mechanical pump housing have a first housing member and a second housing member which are stacked in this order from the first attachment surface side toward the axial second direction side, the first housing member and the second housing member be fastened and fixed to each other by a first fastening bolt inserted in the first housing member and the second housing member from the axial first direction side toward the axial second direction side, and the auxiliary oil pressure source housing and the second housing member be fastened and fixed to each other by a second fastening bolt inserted in the auxiliary oil pressure source housing and the second housing member from the axial second direction side toward the axial first direction side.

According to this configuration, the auxiliary oil pressure source is attached in the case via the mechanical oil pump. The case, the mechanical oil pump housing, and the auxiliary oil pressure source housing are disposed in this order from the axial first direction side toward the axial second direction side in the axial direction. Moreover, the first housing member for the mechanical oil pump and the auxiliary oil pressure source housing are fastened and fixed by the fastening bolts that are inserted in the second housing member in the opposite directions. This ensures the ease of attachment of the mechanical pump housing and the auxiliary oil pressure source housing, and allows the region where the mechanical pump housing is placed and the region where the auxiliary oil pressure source housing is placed to overlap each other as viewed in the axial direction. The auxiliary oil pressure source housing can therefore be easily attached to the mechanical pump housing. As a result, especially the space adjoining the mechanical oil pump in the axial direction in the case can be effectively used as compared to the case where the auxiliary oil pressure source and the mechanical oil pump are disposed side by side along the wall in the case. This can suppress an increase in size of the case in the direction perpendicular to the axial direction.

It is preferable that a plurality of the first fastening bolts and a plurality of the second fastening bolts be provided, the second housing member have a common fastening hole extending therethrough in the axial direction, at least a part of the plurality of the first fastening bolts and at least a part of the plurality of the second fastening bolts be placed coaxially with each other, and the first fastening bolt and the second fastening bolt which are placed coaxially with each other be tightened in the common fastening hole.

According to this configuration, both the first fastening bolt and the second fastening bolt which are placed coaxially with each other can be inserted in the common fastening hole. This can reduce the total number of fastening holes in which the first fastening bolts for fastening the first housing member to the second housing member are inserted and fastening holes in which the second fastening bolts for fastening the electric pump housing to the second housing member are inserted. Accordingly, the mechanical pump housing and the electric pump housing can be reduced in size as compared to the case where individual fastening holes are provided for the first fastening bolts and the second fastening bolts.

It is preferable that the auxiliary oil pressure source be an electric oil pump that is driven by a pump rotating electrical machine, an electromagnetic pump that is driven by an electromagnetic actuator, or an accumulator.

Regardless of how the term is used, the term "rotating electrical machine" is used as a concept including all of a motor (electric motor), a generator (electric generator), and a motor-generator that functions as both a motor and a generator as necessary.

According to this configuration, the electric oil pump, the electromagnetic pump, or the accumulator as the auxiliary oil pressure source can be efficiently placed in the case in the manner described above.

It is preferable that the auxiliary oil pressure source be an electric oil pump that is driven by a pump rotating electrical machine, the electric oil pump include an electric pump rotor as the auxiliary oil pressure generation mechanism and an electric pump housing as the auxiliary oil pressure source housing forming a pump chamber that accommodates the electric pump rotor, and an electric pump axis as a rotation axis of the electric pump rotor be located parallel to a mechanical pump axis as a rotation axis of the mechanical pump rotor.

According to this configuration, the electric pump housing forming the pump chamber for the electric pump rotor is attached to the mechanical pump housing forming the pump chamber for the mechanical pump rotor. The pump chamber for the electric pump rotor and the pump chamber for the mechanical pump rotor can therefore be placed close to each other, and the arrangement configuration of oil passages that are connected to these pump chambers can be simplified or can be made compact. Moreover, the oil passage that is connected from the electric oil pump toward the mechanical oil pump side can be easily and reliably sealed. Since the electric pump axis is located parallel to the mechanical pump axis, the space adjoining the mechanical oil pump in the axial direction can be effectively used to place the electric oil pump.

It is preferable that the auxiliary oil pressure source be an electric oil pump that is driven by a pump rotating electrical machine, the electric oil pump include an electric pump rotor as the auxiliary oil pressure generation mechanism and an electric pump housing as the auxiliary oil pressure source housing forming a pump chamber that accommodates the electric pump rotor, and the second housing member have a first suction oil passage connecting a suction port of the mechanical oil pump to a strainer, and a second suction oil passage connecting a suction port of the electric oil pump to the strainer.

According to this configuration, both the first suction oil passage and the second suction oil passage are formed in the same member, namely the second housing member. The first suction oil passage and the second suction oil passage can therefore be located close to each other, and the configuration of the suction oil passages in the vehicle drive device can be relatively simplified. This can reduce pressure loss in a hydraulic circuit of the vehicle drive device as compared to the case where the suction oil passages for the mechanical oil pump and the electric oil pump are located away from each other and the configuration of the suction oil passages is complicated. Moreover, the regions where the mechanical oil pump and the electric oil pump are placed can be reduced in size in the axial direction. Moreover, alignment of the second suction oil passage and the electric pump rotor and sealing of the second suction oil passage and the electric oil pump can be easily and reliably performed.

DETAILED DESCRIPTION OF EMBODIMENTS

Embodiments of a vehicle drive device according to the present disclosure will be described with reference to the accompanying drawings. A vehicle drive device 1 according to the present embodiment is a vehicle drive device (engine vehicle drive device) that drives a vehicle (what is called an engine vehicle) including an internal combustion engine E as an only driving force source for wheels W of the vehicle. In the present embodiment, the vehicle drive device 1 is configured as a vehicle drive device (idle stop vehicle drive device) that drives a vehicle (idle stop vehicle) having an idle stop function to stop the internal combustion engine E when the vehicle is stopped. Idle stop vehicles can achieve reduction in fuel consumption and reduction in exhaust gas emissions.

1. General Configuration of Vehicle Drive Device

Figure 1:
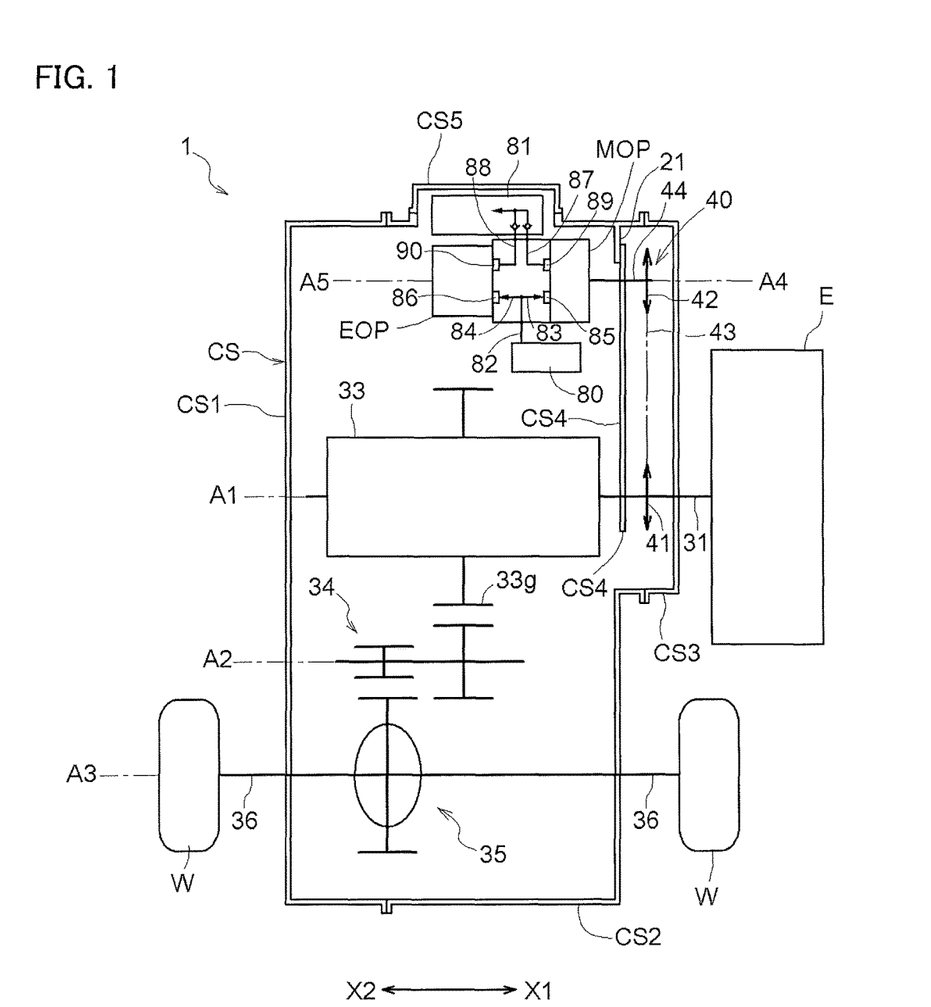
FIG. 1 is a diagram showing a schematic configuration of a vehicle drive device according to an embodiment of the present disclosure.

As shown in FIG. 1, the vehicle drive device 1 includes an input shaft 31 that is drivingly coupled to the internal combustion engine E, and a plurality of (in this example, two) output shafts 36 that are drivingly coupled to a plurality of (in this example, two) wheels W. The vehicle drive device 1 further includes a shift device 33, a counter gear mechanism 34, and a differential gear unit 35. The shift device 33, the counter gear mechanism 34, and the differential gear unit 35 are disposed in this order from the input shaft 31 side on a power transmission path connecting the input shaft 31 and the output shafts 36. That is, the shift device 33, the counter gear mechanism 34, and the differential gear unit 35 correspond to the "driving force transmission mechanism" of the present disclosure which transmits a driving force between the internal combustion engine E as a driving force source and the wheels W. The vehicle drive device 1 further includes a case CS that accommodates the shift device 33, the counter gear mechanism 34, and the differential gear unit 35, a mechanical oil pump MOP, an electric oil pump EOP as an auxiliary oil pressure source, and a hydraulic control device 81.

The internal combustion engine E is a motor (a gasoline engine, a diesel engine, etc.) that is driven by fuel combustion in the engine to output power. In the present embodiment, an internal combustion engine output shaft (a crankshaft etc.) as an output shaft of the internal combustion engine E is drivingly coupled to the input shaft 31. The internal combustion engine output shaft may be drivingly coupled to the input shaft 31 via a damper etc.

The shift device 33 is drivingly coupled to the input shaft 31. In the present embodiment, the shift device 33 is an automatic stepped speed change mechanism including a plurality of shift engagement devices and having a plurality of switchable shift speeds with different speed ratios. An automatic stepless speed change mechanism having a movable sheave connected to a pulley and capable of steplessly changing the speed ratio, etc. may be used as the shift device 33. In any case, the shift device 33 is configured to be driven hydraulically. The shift device 33 performs shifting and torque conversion of rotation and torque which are input to the input shaft 31 in the present embodiment, according to the speed ratio at that time, and transmits the resultant rotation and torque to a shift output gear 33g.

The shift output gear 33g is drivingly coupled to the differential gear unit 35 via the counter gear mechanism 34. The differential gear unit 35 is drivingly coupled to the right and left two wheels W via the right and left two output shafts 36. The differential gear unit 35 distributes the rotation and torque, which are transmitted from the shift output gear 33g via the counter gear mechanism 34, to the right and left two wheels W. The vehicle drive device 1 can thus transmit torque of the internal combustion engine E to the wheels W to move the vehicle.

Figure 5:
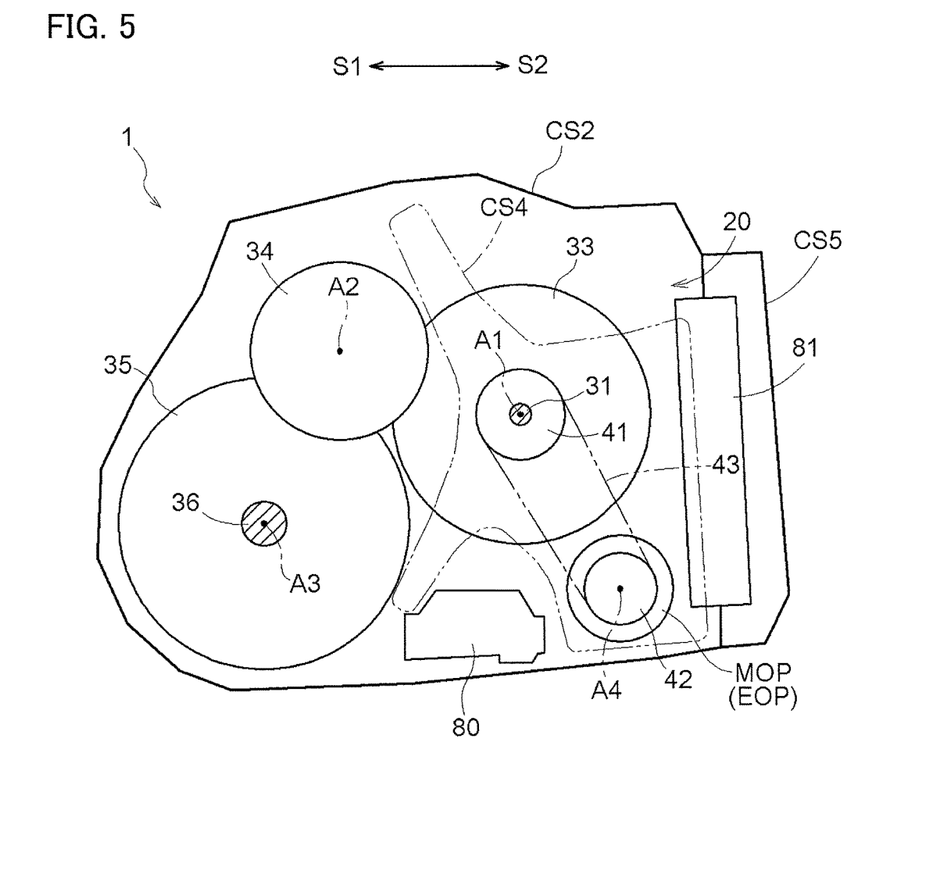
FIG. 5 is a schematic diagram showing the arrangement positions as viewed in the axial direction of the vehicle drive device according to the embodiment of the present disclosure.

In the present embodiment, the shift device 33 is disposed coaxially with the input shaft 31, and the differential gear unit 35 and the output shafts 36 are disposed on a different axis from the input shaft 31. The counter gear mechanism 34 is disposed on a different axis from both the input shaft 31 and the output shafts 36. A first axis A1 as the rotation axis of the shift device 33, a second axis A2 as the rotation axis of the counter gear mechanism 34, and a third axis A3 as the rotation axis of the differential gear unit 35 are disposed parallel to each other. As shown in FIG. 5, the first axis A1, the second axis A2, and the third axis A3 are disposed so as to be located on the vertices of a triangle (in this example, an obtuse triangle whose central angles are about 90° to) 110° as viewed in the axial direction parallel to the rotation axes A1 to A3.

In the present embodiment, the rotation axes A1 to A3 are disposed on different axes from a mechanical pump axis A4 as the rotation axis of a mechanical pump rotor R1 (see FIG. 2) included in the mechanical oil pump MOP and an electric pump axis A5 as the rotation axis of an electric pump rotor R2 included in the electric oil pump EOP. The mechanical pump axis A4 and the electric pump axis A5 are disposed parallel to the axes A1 to A3. The mechanical pump axis A4 and the electric pump axis A5 are parallel to each other. The axial direction is therefore a common axial direction of these five rotation axes A1 to A5. In the present embodiment, the direction from the shift device 33 toward the internal combustion engine E (to the right in FIG. 1) in the axial direction is defined as the axial first direction X1, and the opposite direction to the axial first direction X1, namely the direction from the internal combustion engine E toward the shift device 33 (to the left in FIG. 1) is defined as the axial second direction X2. In the present embodiment, the term "parallel" means a substantially parallel state including a slightly tilted state due to manufacturing errors etc. For convenience of description, the vertical direction in the state where the vehicle drive device 1 is mounted on the vehicle (the vertical direction in FIGS. 3 and 5) will be simply referred to as the vertical direction. The direction perpendicular to the vertical direction and the axial direction is referred to as the horizontal direction (the lateral direction in FIG. 5). The direction from the shift device 33 toward the differential gear unit 35 as viewed in the axial first direction X1 (the leftward direction in FIG. 5) is referred to as the first horizontal direction S1, and the direction from shift device 33 toward the hydraulic control device 81 (the rightward direction in FIG. 5) is referred to as the second horizontal direction S2.

2. Case for Vehicle Drive Device

Figure 2:
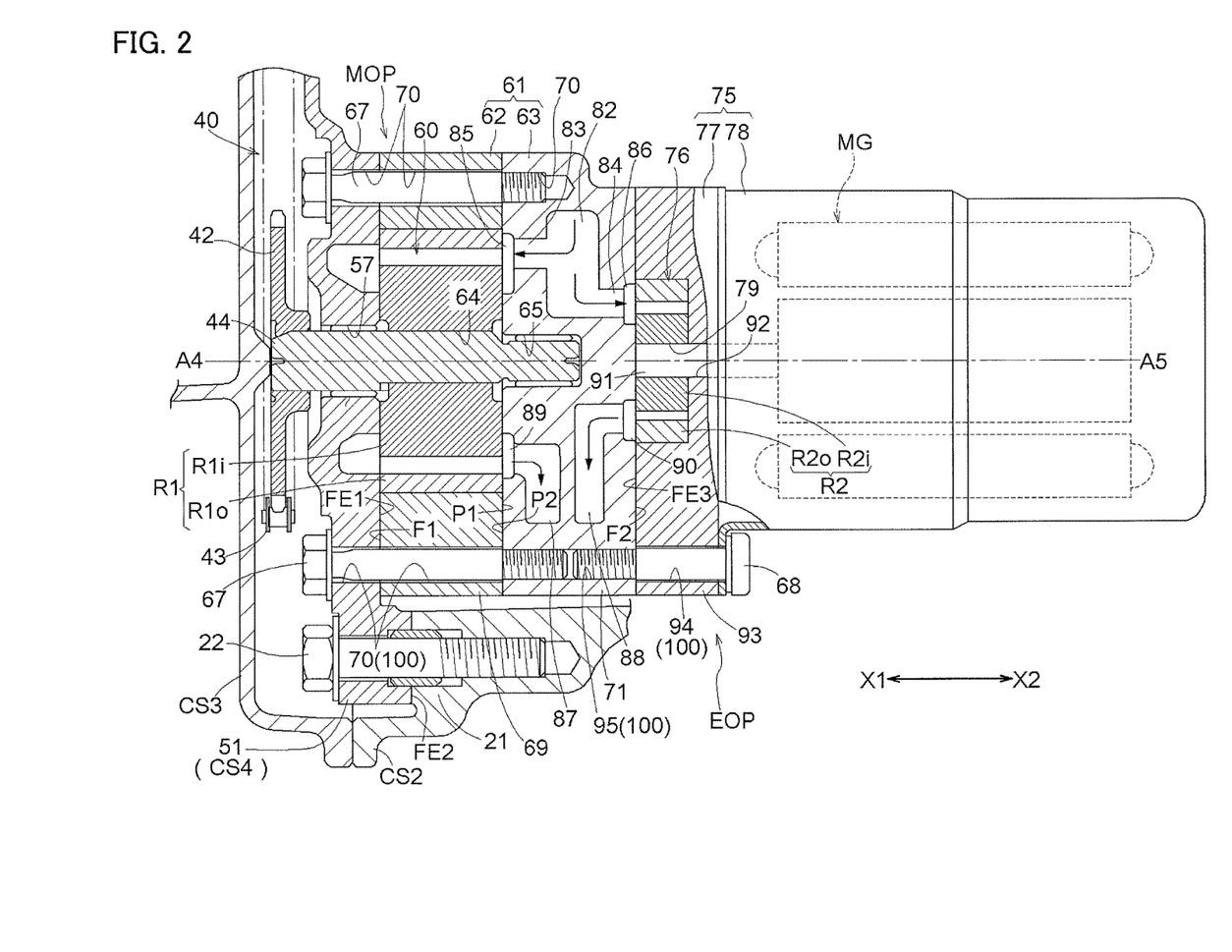
FIG. 2 is an axial sectional view of a mechanical oil pump and an electric oil pump according to the embodiment of the present disclosure.
Figure 3:
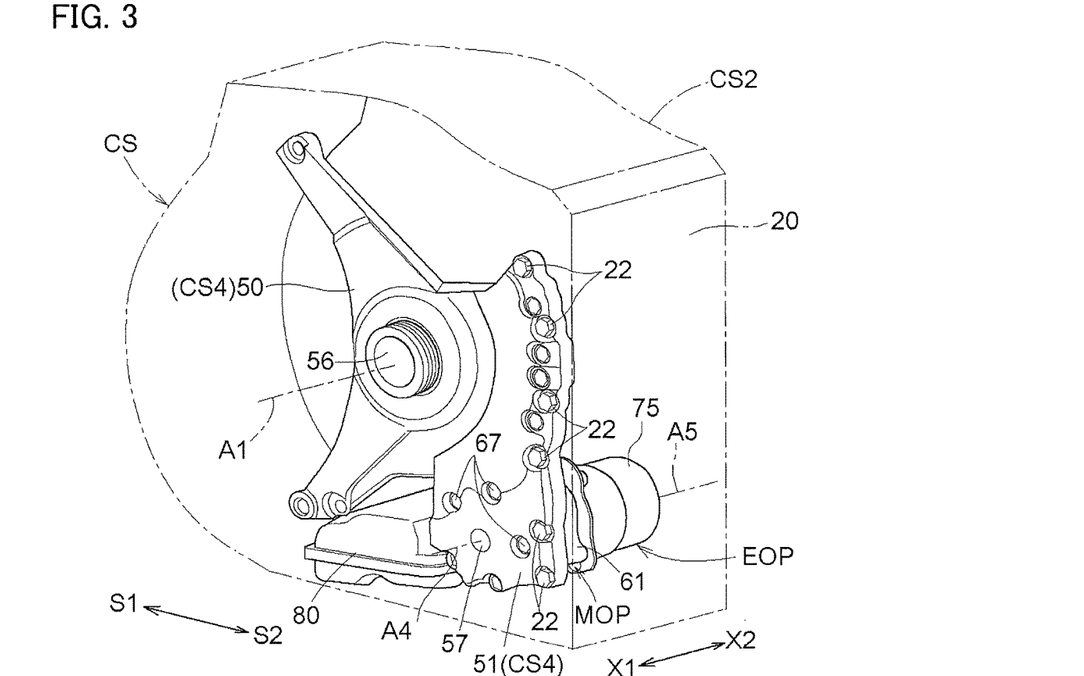
FIG. 3 is a perspective view of a partition wall member according to the embodiment of the present disclosure.
Figure 4:
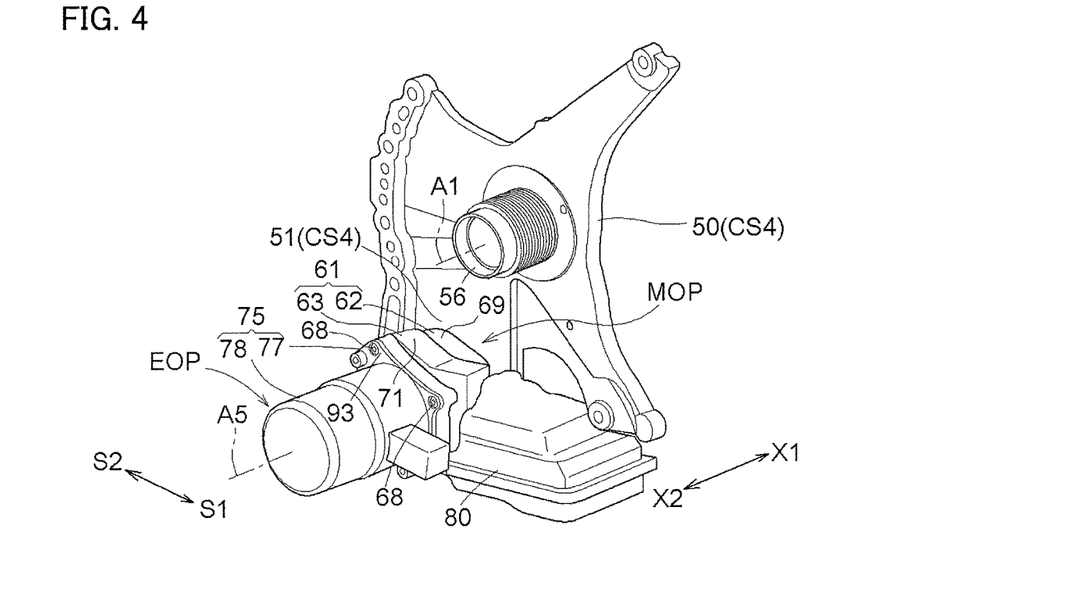
FIG. 4 is a perspective view of the partition wall member, the mechanical oil pump, and the electric oil pump according to the embodiment of the present disclosure.

The case CS accommodates at least the driving force transmission mechanism. In the present embodiment, as shown in FIG. 1, the case CS accommodates the shift device 33, the counter gear mechanism 34, and the differential gear unit 35, and further accommodates a pump drive mechanism 40, the mechanical oil pump MOP, the electric oil pump EOP, a strainer 80, and the hydraulic control device 81. The case CS has an outer wall formed so as to cover the members accommodated in the case CS, and a partition wall that covers partially or entirely the members accommodated in the case CS so as to support or separate these members. As shown in FIGS. 1 to 3, the case CS is formed by a plurality of members, and in the present embodiment, is formed by first to fifth case members CS1 to CS5. FIG. 3 is a perspective view of the fourth case member CS4 as viewed from the axial first direction X1 side and the second horizontal direction S2 side, and the second case member CS2 is shown by a long dashed, short dashed line. FIG. 4 is a perspective view of the fourth case member CS4 as viewed from the axial second direction X2 side and the first horizontal direction S1 side.

Specifically, the first case member CS1 is located closest to the axial second direction X2 side among the members forming the case CS, and is formed so as to cover axial second direction X2-side ends of the shift device 33 and the counter gear mechanism 34 from the axial second direction X2 side. The first case member CS1 has a through hole through which the output shaft 36 extends. The first case member CS1 accommodates a part of the shift device 33, a part of the counter gear mechanism 34, and a main part of the differential gear unit 35. The second case member CS2 is a case member having the shape of an irregular tube and coupled to the axial first direction X1 side of the first case member CS1. The second case member CS2 accommodates a main part of the shift device 33, a main part of the counter gear mechanism 34, the mechanical oil pump MOP, the electric oil pump EOP, the strainer 80, a part of the hydraulic control device 81, and a part of the differential gear unit 35.

As shown in FIGS. 3 and 5, a peripheral wall of the second case member CS2 has an opening 20 that opens toward the second horizontal direction S2 side. The hydraulic control device 81 is placed at the position of the opening 20. The fifth case member CS5 is fixed to the second case member CS2 in a sealed manner so as to cover from the second horizontal direction S2 side the hydraulic control device 81 placed at the position of the opening 20. That is, the fifth case member CS5 functions as a cover member for the hydraulic control device 81. As shown in FIGS. 1 and 2, a radially projecting portion 21 projecting radially inward from the peripheral wall of the second case member CS2 is formed on the inner peripheral surface of the peripheral wall of the second case member CS2, and the fourth case member CS4 is fixed to the radially projecting portion 21. In the present embodiment, as shown in FIG. 2, the radially projecting portion 21 is formed so as to project radially inward from the inner peripheral surface of the peripheral wall near the joint portion of the second case member CS2 and the third case member CS3. The fourth case member CS4 is fixed to the radially projecting portion 21 by a plurality of case fastening bolts 22 such that the surface of the radially projecting portion 21 which faces the axial first direction X1 side contacts the surface of the radially outer end of the fourth case member CS4 which faces the axial second direction X2 side. In the present embodiment, the radial direction refers to the direction perpendicular to the mechanical pump axis A4.

The strainer 80 that filters oil is disposed in an oil reservoir such as an oil pan. In the present embodiment, the inner peripheral surface of the lower side (the lower side in FIGS. 3 and 5) of the second case member CS2 forms the oil reservoir, and the strainer 80 is disposed so as to be soaked in oil in the oil reservoir. The second case member CS2 also has a through hole through which the output shaft 36 extends. The third case member CS3 is coupled to the axial first direction X1 side of the second case member CS2, and accommodates the pump drive mechanism 40 so as to cover the pump drive mechanism 40 from the axial first direction X1 side. The third case member CS3 has a through hole (not shown) extending therethrough in the axial direction. The input shaft 31 extends through this through hole and is coupled to the internal combustion engine E.

The fourth case member CS4 is a support member that supports a plurality of members in the case CS. In the present embodiment, as shown in FIGS. 3 and 4, the fourth case member CS4 supports the input shaft 31 serving also as a shift input shaft, and supports the mechanical oil pump MOP from the axial first direction X1 side. The fourth case member CS4 indirectly supports the electric oil pump EOP via the mechanical oil pump MOP. The strainer 80 may also be fixed to a mechanical pump housing 61, and in this case, the fourth case member CS4 indirectly supports the strainer 80 as well. The fourth case member CS4 is fixed to the second case member CS2.

The fourth case member CS4 is a plate-like member, and in the present embodiment, is formed in the shape of a plate having an irregular shape as viewed in the axial direction. As shown in FIGS. 3 and 4, the fourth case member CS4 includes a shift shaft support portion 50 that supports the input shaft 31, and an oil pump support portion 51 that supports the mechanical oil pump MOP (the electric oil pump EOP). In the present embodiment, the shift shaft support portion 50 and the oil pump support portion 51 are formed as a single-piece member. The shift shaft support portion 50 has a first through hole 56 extending therethrough in the axial direction. The input shaft 31 is inserted through the first through hole 56 so as to be rotatably supported. As shown in FIG. 5, the fourth case member CS4 is positioned so as not to overlap the differential gear unit 35 as viewed in the axial direction.

As shown in FIG. 2, the oil pump support portion 51 has, in its surface on one side in the axial direction, a first surface FE1 that contacts a first attachment surface F1 of the mechanical oil pump MOP. In the present embodiment, the oil pump support portion 51 has the first surface FE1 in its surface facing the axial second direction X2 side. The oil pump support portion 51 has, in its surface on one side in the axial direction, a second surface FE2 that is coupled to the second case member CS2. In the present embodiment, as shown in FIG. 2, the oil pump support portion 51 has, in the surface of its radially outer end which faces the axial second direction X2 side, the second surface FE2 that contacts the surface of the radially projecting portion 21 of the second case member CS2 which faces the axial first direction X1 side. That is, the second surface FE2 is located radially outward of the first surface FE1.

The second case member CS2 and the oil pump support portion 51 are fastened and fixed by the case fastening bolts 22 such that second surface FE2 of the oil pump support portion 51 contacts the surface of the second case member CS2 which faces the axial first direction X1 side. In the present embodiment, a part of the shift shaft support portion 50 is located above the oil pump support portion 51 (see FIG. 3), and the second case member CS2 and the shift shaft support portion 50 are fastened and fixed to each other by the case fastening bolts 22 such that the surface of the radially outer end of the shift shaft support portion 50 which faces the axial second direction X2 side contacts the surface of the radially projecting portion 21 of the second case member CS2 which faces the axial first direction X1 side. In the present embodiment, the fourth case member CS4 is thus fixed to the second case member CS2.

The oil pump support portion 51 has a second through hole 57 extending therethrough in the axial direction. A mechanical pump shaft 44 of the mechanical oil pump MOP is inserted through the second through hole 57, so that the mechanical pump shaft 44 is rotatably supported by the oil pump support portion 51. The oil pump support portion 51 further has fastening holes extending therethrough, so that the case fastening bolts 22 are inserted therethrough. The oil pump support portion 51 further has, as through holes extending therethrough in the axial direction, first fastening bolt holes 70 through which first fastening bolts 67 for fastening and fixing the oil pump support portion 51 and the mechanical pump housing 61 are inserted.

As described above, in the present embodiment, the mechanical oil pump MOP (the electric oil pump EOP) is attached to the fourth case member CS4 that supports the input shaft 31 as the shift input shaft, and the electric oil pump EOP is attached to the mechanical oil pump MOP. It is therefore not necessary to separately provide a dedicated support member that supports the mechanical oil pump MOP or the electric oil pump EOP. This can reduce the number of parts and can reduce cost.

3. Mechanical Oil Pump

The mechanical oil pump MOP is an oil pump that is driven by the driving force source for the wheels W, and is drivingly coupled to the input shaft 31. In the present embodiment, as shown in FIGS. 1 and 2, the mechanical oil pump MOP is drivingly coupled to the input shaft 31 via the pump drive mechanism 40. As shown in FIG. 1, the pump drive mechanism 40 includes a first sprocket 41 as a drive element, a second sprocket 42 as a driven element, and a chain 43 as a coupling element. The first sprocket 41 is fixed to the input shaft 31 and rotates together with the input shaft 31. As shown in FIG. 2, the second sprocket 42 is fixed to the mechanical pump shaft 44 drivingly coupled to the mechanical pump rotor R1 of the mechanical oil pump MOP, and rotates together with the mechanical pump shaft 44. The chain 43 is wound around the first sprocket 41 and the second sprocket 42. In the present embodiment, the pump drive mechanism 40 is accommodated in the space surrounded by the surface of the fourth case member CS4 which faces the axial first direction X1 side and the inner peripheral surface of the third case member CS3 in the axial direction.

The mechanical oil pump MOP includes the mechanical pump rotor R1 and the mechanical pump housing 61 forming a pump chamber 60 that accommodates the mechanical pump rotor R1. The mechanical oil pump MOP is an oil pump that sucks oil from a first suction port 85 (described later) and discharges the oil to a first discharge port 89 (described later) according to rotation of the mechanical pump rotor R1. In the present embodiment, as shown in FIG. 2, the mechanical oil pump MOP is an internal gear pump having as the mechanical pump rotor R1 a first outer rotor R1o having an internal gear and a first inner rotor R1i fitted in the first outer rotor R1o and having an external gear. The first outer rotor R1o and the first inner rotor R1i mesh with each other such that the center of the first inner rotor R1i is offset from the center of the first outer rotor R1o. The mechanical oil pump MOP is not limited to this configuration. For example, the mechanical oil pump MOP may be an external gear pump, a vane pump, etc.

The mechanical pump housing 61 is attached to a wall in the case CS of the vehicle drive device 1. In the present embodiment, the mechanical pump housing 61 is attached to the fourth case member CS4. Specifically, as shown in FIG. 2, the mechanical pump housing 61 has the first attachment surface F1 that faces the axial first direction X1 side or one side in the axial direction of the mechanical pump axis A4, and the mechanical pump housing 61 is attached to the fourth case member CS4 such that the first attachment surface F1 contacts the first surface FE1 of the oil pump support portion 51 which faces the axial second direction X2 side. The mechanical pump housing 61 further has a second attachment surface F2 that faces the axial second direction X2 side in the opposite direction to the axial first direction X1. An electric pump housing 75 is attached to the mechanical pump housing 61 such that the second attachment surface F2 contacts a third surface FE3 as a surface of the electric pump housing 75 (described later) which faces the axial first direction X1 side.

The mechanical pump housing 61 may be formed by a plurality of housing members. In the present embodiment, as shown in FIG. 2, the mechanical pump housing 61 has a first housing member 62 and a second housing member 63 which are stacked in this order from the first attachment surface F1 side toward the axial second direction X2 side. The first housing member 62 has the first attachment surface F1 that is an attachment surface to the fourth case member CS4, and a first coupling surface P1 that is a surface on the opposite side in the axial direction from the first attachment surface F1 and that faces the axial second direction X2 side. The second housing member 63 has the second attachment surface F2 that is an attachment surface to the electric pump housing 75, and a second coupling surface P2 that is a surface on the opposite side in the axial direction from the second attachment surface F2 and that faces the axial first direction X1 side. The first housing member 62 is attached to the oil pump support portion 51 such that the first attachment surface F1 contacts the first surface FE1. The first housing member 62 is attached to the second housing member 63 such that the first coupling surface P1 contacts the second coupling surface P2. At this time, the first housing member 62 and the second housing member 63 are fastened and fixed to each other by the first fastening bolts 67 inserted in the first housing member 62 and the second housing member 63 from the axial first direction X1 side toward the axial second direction X2 side. In the present embodiment, the first fastening bolts 67 are also inserted in the first fastening bolt holes 70 of the oil pump support portion 51. That is, the first fastening bolts 67 are inserted so that the oil pump support portion 51, the first housing member 62, and the second housing member 63 are fastened together from the axial first direction X1-side surface of the oil pump support portion 51 toward the axial second direction X2 side.

A rotor accommodating member 77 of the electric pump housing 75 is attached to the second housing member 63. Specifically, the second housing member 63 and the rotor accommodating member 77 are fastened and fixed to each other by second fastening bolts 68 inserted in the electric pump housing 75 and the second housing member 63 from the axial second direction X2 side toward the axial first direction X1 side such that the second attachment surface F2 contacts the third surface FE3 as a surface of the rotor accommodating member 77 which faces the axial first direction X1 side. In the present embodiment, the oil pump support portion 51, the first housing member 62, the second housing member 63, and the electric pump housing 75 are thus attached in this order toward the axial second direction X2 side. That is, the fourth case member CS4, the mechanical pump housing 61, and the electric pump housing 75 are attached in this order toward the axial second direction X2 side. The electric oil pump EOP can thus be placed by effectively using the space in the axial direction which is required to place the shift device 33 therein.

In the present embodiment, as shown in FIG. 2, the pump chamber 60 is formed in the first housing member 62. Specifically, the pump chamber 60 is a hole formed in a columnar shape by drilling the first housing member 62 so that the pump chamber 60 extends therethrough in the axial direction, and accommodates the mechanical pump rotor R1. In the present embodiment, the axial length of the first housing member 62 is the same as that of the mechanical pump rotor R1 and that of the pump chamber 60, and the axial second direction X2-side end face of the pump chamber 60 is covered by the second coupling surface P2 of the second housing member 63. The axial first direction X1-side end face of the pump chamber 60 is covered by the first surface FE1 of the oil pump support portion 51. As shown in FIG. 2, the first inner rotor R1i has in its center a third through hole 64 extending therethrough in the axial direction, and the mechanical pump shaft 44 is inserted through the third through hole 64. The first inner rotor R1i and the mechanical pump shaft 44 are thus coupled so as to rotate together. The mechanical pump axis A4 as the rotation axis of the mechanical oil pump MOP matches the rotation axis of the mechanical pump shaft 44.

As shown in FIG. 2, the mechanical pump shaft 44 inserted through the third through hole 64 projects beyond the mechanical pump rotor R1 toward the axial second direction X2 side. The axial second direction X2-side end of the mechanical pump shaft 44 projecting toward the axial second direction X2 side is inserted in a shaft support hole 65 as a recess formed in the second coupling surface P2 of the second housing member 63, and is rotatably supported.

The first housing member 62 is formed in the shape of a pillar having a thickness in the axial direction. In the present embodiment, the first housing member 62 is attached such that the mechanical pump shaft 44 is placed in the center of the sectional shape of the first housing member 62 as viewed in the axial direction. The first housing member 62 has a plurality of fastening bolt holes extending therethrough in the axial direction. In the present embodiment, the first housing member 62 has a plurality of first radially projecting portions 69 projecting radially outward with respect to the remaining part of the first housing member 62 as viewed in the axial direction. Each of the first radially projecting portions 69 has a first fastening bolt hole 70 through which the first fastening bolt 67 is inserted. The first fastening bolts 67 are inserted through the plurality of first fastening bolt holes 70.

The second housing member 63 is formed in the shape of a pillar having a thickness in the axial direction. In the present embodiment, the second housing member 63 is attached to the first housing member 62 such that the center position of the sectional shape of the second housing member 63 as viewed in the axial directional is located on the mechanical pump axis A4. That is, the shaft support hole 65 is formed in the center of the sectional shape of the second housing member 63 so as to open toward the second coupling surface P2 side.

The second housing member 63 has a plurality of fastening bolt holes that open toward the second coupling surface P2 side. In the present embodiment, the second housing member 63 has a common fastening hole 95 extending therethrough in the axial direction. A part of the plurality of fastening bolt holes formed to open toward the second coupling surface P2 side is the common fastening hole 95 extending through the second housing member 63 in the axial direction. Of the plurality of fastening bolt holes formed to open toward the second coupling surface P2 side, each fastening bolt hole other than the common fastening hole 95 is a first fastening bolt hole 70. In the state where the first housing member 62 is attached to the second housing member 63, the first fastening bolt hole 70 formed in the second housing member 63 is located coaxially with the first fastening bolt hole 70 formed in the first housing member 62 (see the upper bolt in FIG. 2). In the state where the first housing member 62 is attached to the second housing member 63, the common fastening hole 95 formed in the second housing member 63 is also located coaxially with the first fastening bolt hole 70 formed in the first housing member 62 (see the lower bolt in FIG. 2).

In the present embodiment, as shown in FIGS. 2 and 4, the second housing member 63 has a plurality of second radially projecting portions 71 projecting radially outward with respect to the remaining part of the second housing member 63 as viewed in the axial direction. The common fastening hole 95 and the first fastening bolt hole 70 are formed in a part of the plurality of second radially projecting portions 71.

The first suction port 85 that causes oil from the strainer 80 to flow into the pump chamber 60 and the first discharge port 89 that discharges oil contained in the pump chamber 60 to the outside of the pump chamber 60 in order to supply the oil to the hydraulic control device 81 are formed in the second coupling surface P2 of the second housing member 63. The first suction port 85 and the first discharge port 89 are formed at different positions in the circumferential direction of the second coupling surface P2 as viewed in the axial direction. In the present embodiment, the circumferential direction corresponds to the circumferential direction based on the mechanical pump axis A4.

The second housing member 63 has a suction oil passage that connects the first suction port 85 of the mechanical oil pump MOP to the strainer 80 and a discharge oil passage that connects the first discharge port 89 of the mechanical oil pump MOP to the hydraulic control device 81. The second housing member 63 further has a suction oil passage that connects a second suction port 86 (described later) of the electric oil pump EOP to the strainer 80 and a discharge oil passage that connects a second discharge port 90 (described later) of the electric oil pump EOP to the hydraulic control device 81. In the present embodiment, the suction oil passages and the discharge oil passages are formed in the second housing member 63. The suction oil passages and the discharge oil passages are not limited to this configuration. The suction oil passages and the discharge oil passages may be formed in the form of a groove in the second coupling surface P2 or the second attachment surface F2. In the present embodiment, a common suction oil passage 82 connected to the strainer 80, a first suction oil passage 83 connected to the common suction oil passage 82 to guide oil flowing from the common suction oil passage 82 into the first suction oil passage 83 to the first suction port 85 of the mechanical oil pump MOP, and a second suction oil passage 84 branching off from the joint portion of the common suction oil passage 82 and the first suction oil passage 83 to guide oil flowing from the common suction oil passage 82 into the second suction oil passage 84 to the second suction port 86 of the electric oil pump EOP are formed in the second housing member 63. A first discharge oil passage 87 connecting the first discharge port 89 of the mechanical oil pump MOP to the hydraulic control device 81 and a second discharge oil passage 88 connecting the second discharge port 90 of the electric oil pump EOP to the hydraulic control device 81 are also formed in the second housing member 63. The first suction oil passage of the present disclosure is formed by the common suction oil passage 82 and the first suction oil passage 83 of the present embodiment, and the second suction oil passage of the present disclosure is formed by the common suction oil passage 82 and the second suction oil passage 84 of the present embodiment.

The second suction port 86 that causes oil from the strainer 80 to flow into a pump chamber 76 of the electric oil pump EOP and the second discharge port 90 that discharges oil contained in the pump chamber 76 to the outside of a pump chamber 72 in order to supply the oil to the hydraulic control device 81 are formed in the second attachment surface F2 of the second housing member 63. The second suction port 86 and the second discharge port 90 are formed at different positions in the circumferential direction of the second attachment surface F2 as viewed in the axial direction.

The second housing member 63 has a plurality of fastening bolt holes that open to the second attachment surface F2 side. In the present embodiment, a part of the plurality of fastening bolt holes formed to open toward the second attachment surface F2 side is the common fastening hole 95. Of the plurality of fastening bolt holes formed in the second housing member 63 so as to open toward the second coupling surface P2 side, each fastening bolt hole other than the common fastening hole 95 is a second fastening bolt hole 94 (not shown). In the state where the rotor accommodating member 77 is attached to the second housing member 63, the second fastening bolt hole 94 is located coaxially with a second fastening bolt hole 94 formed in the rotor accommodating member 77. In the state where the rotor accommodating member 77 is attached to the second housing member 63, the common fastening hole 95 formed in the second housing member 63 is also located coaxially with the second fastening bolt hole 94 formed in the rotor accommodating member 77.

In the present embodiment, the second fastening bolt hole 94 of the second housing member 63 is formed in each second radially projecting portion 71 in which neither the common fastening hole 95 nor the first fastening bolt hole 70 are formed out of the plurality of second radially projecting portions 71.

As described above, the first fastening bolt hole 70 formed in the oil pump support portion 51, the first fastening bolt hole 70 formed in the first housing member 62, the common fastening hole 95 formed in the second housing member 63, and the second fastening bolt hole 94 formed in the rotor accommodating member 77 are located coaxially with each other. These holes connect in the axial direction to form a single pump housing through hole 100 extending through the oil pump support portion 51, the mechanical pump housing 61, and the electric pump housing 75. At least a part of the plurality of first fastening bolts 67 is tightened in the first fastening bolt holes 70 forming the pump housing through hole 100, at least a part of the plurality of second fastening bolts 68 is tightened in the second fastening bolt hole 94 forming the pump housing through hole 100, and the first fastening bolt 67 and the second fastening bolt 68 which are tightened in the pump housing through hole 100 are located coaxially with each other. The first fastening bolt 67 and the second fastening bolt 68 which are located coaxially with each other are tightened in the common fastening hole 95 in the second housing member 63. The first radially projecting portion 69 and the second radially projecting portion 71 each having the first fastening bolt hole 70 for fastening the first housing member 62 and the second housing member 63, and the second radially projecting portion 71 and a third radially projecting portion 93 each having the second fastening bolt hole 94 for fastening the second housing member 63 and the rotor accommodating member 77 of the electric oil pump EOP can thus be located at the same position in the circumferential direction based on the mechanical pump axis A4. The outer shapes of the mechanical pump housing 61 and the electric pump housing 75 can therefore be reduced in size as compared to the case where the first radially projecting portion 69 and the second radially projecting portion 71, and the second radially projecting portion 71 and the third radially projecting portion 93 are located at different positions in the circumferential direction based on the mechanical pump axis A4, and the vehicle drive device 1 can be reduced in size.

4. Electric Oil Pump

The vehicle drive device 1 includes an auxiliary oil pressure source. The auxiliary oil pressure source includes an auxiliary oil pressure generation mechanism that generates an auxiliary oil pressure, and an auxiliary oil pressure source housing that accommodates the auxiliary oil pressure generation mechanism. The auxiliary oil pressure source housing is attached to the mechanical pump housing 61.

In the present embodiment, the auxiliary oil pressure source is the electric oil pump EOP that is driven by a pump rotating electrical machine MG. The electric oil pump EOP is an oil pump that is driven by the pump rotating electrical machine MG. The electric oil pump EOP is drivingly coupled to the pump rotating electrical machine MG provided independently of the power transmission path connecting the input shaft 31 and the output shafts 36. In the present embodiment, as shown in FIG. 2, the electric oil pump EOP is provided integrally with the pump rotating electrical machine MG. The electric oil pump EOP includes an electric pump rotor R2 as the auxiliary oil pressure generation mechanism, and the electric pump housing 75 as the auxiliary oil pressure source housing that forms the pump chamber 76 accommodating the electric pump rotor R2. The electric oil pump EOP is an oil pump in which the electric pump rotor R2 is rotated by the driving force of the pump rotating electrical machine MG and which sucks oil from the second suction port 86 and discharges the oil to the second discharge port 90 according to the rotation of the electric pump rotor R2. In the present embodiment, as shown in FIG. 2, the electric oil pump EOP is an internal gear pump having as the electric pump rotor R2 a second outer rotor R2o having an internal gear and a second inner rotor R2i fitted in the second outer rotor R2o and having an external gear. The second outer rotor R2o and the second inner rotor R2i mesh with each other such that the center of the second inner rotor R2i is offset from the center of the second outer rotor R2o. The electric oil pump EOP is not limited to this configuration. For example, the electric oil pump EOP may be an external gear pump, a vane pump, etc.

The electric pump housing 75 is a member that accommodates the electric pump rotor R2 and the pump rotating electrical machine MG. In the present embodiment, the electric pump housing 75 has the rotor accommodating member 77 that accommodates the electric pump rotor R2, and a rotating electrical machine accommodating member 78 that accommodates the pump rotating electrical machine MG. In the present embodiment, the rotor accommodating member 77 and the rotating electrical machine accommodating member 78 are fastened together to the second housing member 63 by the second fastening bolts 68. The electric pump housing 75 is attached to the second housing member 63 of the mechanical pump housing 61 such that the rotor-accommodating member 77 is located on the axial first direction X1 side of the rotating electrical machine accommodating member 78. The surface of the rotor accommodating member 77 which faces the axial first direction X1 side is therefore the third surface FE3.

In the present embodiment, the rotor accommodating member 77 is a member in the shape of a pillar having a thickness in the axial direction. The pump chamber 76 is formed in the rotor accommodating member 77. Specifically, the pump chamber 76 is a recess formed in a columnar shape by drilling the third surface FE3, and accommodates the electric pump rotor R2. The second inner rotor R2i has a fourth through hole 79 formed in its center so as to extend therethrough in the axial direction, and an electric pump shaft 91 extends through the fourth through hole 79. The electric pump shaft 91 is thus coupled to the second inner rotor R2i so as to rotate together therewith. The electric pump axis A5 of the electric oil pump EOP matches the rotation axis of the electric pump shaft 91.

The rotor accommodating member 77 has a fifth through hole 92 extending therethrough in the axial direction. Specifically, the fifth through hole 92 is a through hole that extends through the rotor accommodating member 77 from the axial second direction X2-side surface of the pump chamber 76 toward the axial second direction X2 side. The electric pump shaft 91 is inserted through the fifth through hole 92 and is rotatably supported by the rotor accommodating member 77.

The rotating electrical machine accommodating member 78 is formed in a cylindrical shape having its end on one side in the axial direction closed, and the pump rotating electrical machine MG is accommodated in the space inside the rotating electrical machine accommodating member 78. A rotor of the pump rotating electrical machine MG is coupled to the electric pump shaft 91 inserted through the fifth through hole 92 so that the rotor of the pump rotating electrical machine MG rotates together with the electric pump shaft 91. The pump rotating electrical machine MG functions as a motor (electric motor) that generates power in response to supply of electric power from a battery etc.

As described above, the mechanical pump axis A4 and the electric pump axis A5 are placed parallel to each other. In the present embodiment, the mechanical pump axis A4 and the electric pump axis A5 are located coaxially with each other. The mechanical pump axis A4 and the electric pump axis A5 may be located on different axes.

The rotor accommodating member 77 has a plurality of fastening bolt holes extending therethrough in the axial direction. In the present embodiment, the rotor accommodating member 77 has a plurality of the third radially projecting portions 93 projecting radially outward with respect to the cylindrical portion of the rotating electrical machine accommodating member 78 as viewed in the axial direction, and the second fastening bolt hole 94 is formed in each of the third radially projecting portions 93 so as to extend therethrough in the axial direction. The second fastening bolts 68 are tightened in the plurality of second fastening bolt holes 94.

5. Positions of Oil Pumps

The positions of the mechanical oil pump MOP and the electric oil pump EOP in the vehicle drive device 1 and the positional relationship of the mechanical oil pump MOP and the electric oil pump EOP with other members will be described with reference to FIG. 5. As shown in FIG. 5, in the state where the vehicle drive device 1 is mounted on the vehicle, the third axis A3 as the rotation axis of the differential gear unit 35 is located at a position below the first axis A1 as the rotation axis of the shift device 33 and on one side of the first axis A1 as viewed in the axial direction parallel to each axis. The hydraulic control device 81 is located on the opposite side of the first axis A1 from the third axis A3 side as viewed in the axial direction. The mechanical pump axis A4 (the electric pump axis A5) is located at a position below the first axis A1 and between the first axis A1 and the hydraulic control device 81 as viewed in the axial direction. In the present embodiment, as shown in FIG. 5, the second axis A2 as the rotation axis of the counter gear mechanism 34 is located at the uppermost position among the first axis A1, the second axis A2, and the third axis A3. The third axis A3 is located at the lowermost position among the axes A1 to A3. That is, the axes A1 to A3 are disposed in the vertical direction in order of the second axis A2, the first axis A1, and the third axis A3 from above. In the present embodiment, the first axis A1 is located on the second horizontal direction S2 side or the hydraulic control device 81 side of the second axis A2, and the third axis A3 is located on the first horizontal direction S1 side of the second axis A2 or the opposite side of the second axis A2 from the hydraulic control device 81 side. That is, the axes A1 to A3 are disposed in order of the third axis A3, the second axis A2, and the first axis A1 from the first horizontal direction S1 side toward the second horizontal direction S2 side. The hydraulic control device 81 is located on the second horizontal direction S2 side of the first axis A1.

Regarding the positional relationship among the first axis A1, the third axis A3, and the hydraulic control device 81, the third axis A3 is located at a position below the first axis A1 and on the first horizontal direction S1 side of the first axis A1 as viewed in the axial direction. The hydraulic control device 81 is located on the opposite side of the first axis A1 from the third axis A3 side (in this example, on the second horizontal direction S2 side) as viewed in the axial direction. The third axis A3, the first axis A1, and the hydraulic control device 81 are disposed in this order from the first horizontal direction S1 side toward the second horizontal direction S2 side as viewed in the axial direction.

In the present embodiment, the counter gear mechanism 34 is positioned so as to have portions that overlap the shift device 33 and the differential gear unit 35 as viewed in the axial direction. The shift device 33 and the differential gear unit 35 are placed so as not to have any overlapping portion as viewed in the axial directional. The distance by which the first axis A1 and the third axis A3 are separated from each other is larger than the sum of the radius of the shift device 33 and the radius of the differential gear unit 35. The differential gear unit 35 has a larger diameter than the shift device 33. The lowest point of the shift device 33 is located above the lowest point of the differential gear unit 35 (in this example, is located at about the same position as the third axis A3) and is located above the lowest point of the hydraulic control device 81 in the vertical direction.

In such a configuration, dead space is created in a region of the case CS which is located below the shift device 33 and between the differential gear unit 35 and the hydraulic control device 81 as viewed in the axial directional (see FIG. 5). In the present embodiment, in order to effectively use this dead space, the mechanical oil pump MOP and the electric oil pump EOP are entirely placed between the first axis A1 and the hydraulic control device 81 as viewed in the axial direction. The mechanical oil pump MOP and the electric oil pump EOP are placed in a region formed between the outer peripheral surface of the shift device 33 and the first horizontal direction S1-side side surface of the hydraulic control device 81 and having a V-shape as viewed in the axial direction. The mechanical oil pump MOP and the electric oil pump EOP are entirely placed below the third axis A3 and above the lowest point of the differential gear unit 35 in the vertical direction. The internal space of the case CS (especially the space in the lower part of the second case member CS2) can be effectively used by using such a layout configuration. This can effectively suppress an increase in overall size of the vehicle drive device 1.

6. Other Embodiments

Lastly, other embodiments of the vehicle drive device according to the present disclosure will be described. The configuration disclosed in each of the following embodiments may be applied in combination with the configurations disclosed in the other embodiments unless inconsistency arises.

(1) The above embodiment is described with respect to an example in which the present disclosure is applied to a drive device for vehicles having only an internal combustion engine E as a driving force source for wheels W. However, embodiments of the present disclosure are not limited to this. For example, the present disclosure is also applicable to a drive device for hybrid vehicles having both an internal combustion engine E and a rotating electrical machine (a rotating electrical machine for driving wheels) as driving force sources for wheels W. In the case of the drive device for hybrid vehicles, the mechanical oil pump MOP may be driven by torque of a predetermined one of the internal combustion engine E and the rotating electrical machine. Alternatively, the mechanical oil pump MOP may be selectively driven by one of the internal combustion engine E and the rotating electrical machine which has a higher rotational speed. The present disclosure is also applicable to a drive device for electric vehicles including a rotating electrical machine (a rotating electrical machine for driving wheels) as an only driving force source for wheels W of the vehicle.

(2) The above embodiment is described with respect to an example in which the mechanical pump housing 61 is formed by two members, namely the first housing member 62 and the second housing member 63. However, the present disclosure is not limited to this. The mechanical pump housing 61 may be formed by three or more members. For example, the mechanical pump housing 61 may further include a third housing member between the fourth case member CS4 and the first housing member 62.

(3) The above embodiment is described with respect to an example in which the first suction oil passage 83 and the second suction oil passage 84 are provided as oil passages that connect the mechanical oil pump MOP and the electric oil pump EOP to the strainer 80, and the upstream part of the first suction oil passage 83 and the upstream part of the second suction oil passage 84 are provided as the common suction oil passage 82. However, embodiments of the present disclosure are not limited to this. For example, the first suction oil passage 83 and the second suction oil passage 84 may be oil passages independent of each other. The above embodiment is described with respect to an example in which the first discharge oil passage 87 and the second discharge oil passage 88 are oil passages independent of each other. However, embodiments of the present disclosure are not limited to this. For example, the downstream part of the first discharge oil passage 87 and the downstream part of the second discharge oil passage 88 may be provided as a common oil passage.

(4) In the above embodiment, the second housing member 63 has the first suction oil passage 83 that connects the first suction port 85 of the mechanical oil pump MOP to the strainer 80, the first discharge oil passage 87 that connects the first discharge port 89 of the mechanical oil pump MOP to the hydraulic control device 81, the second suction oil passage 84 that connects the second suction port 86 of the electric oil pump EOP to the strainer 80, and the second discharge oil passage 88 that connects the second discharge port 90 of the electric oil pump EOP to the hydraulic control device 81. However, embodiments of the present disclosure are not limited to this. The second housing member 63 may have only the first suction oil passage 83 and the second suction oil passage 84 or may have only the first discharge oil passage 87 and the second discharge oil passage 88. The second housing member 63 may have only one of the first suction oil passage 83, the second suction oil passage 84, the first discharge oil passage 87, and the second discharge oil passage 88. The second housing member 63 may not have any of the first suction oil passage 83, the second suction oil passage 84, the first discharge oil passage 87, and the second discharge oil passage 88.

(5) The above embodiment is described with respect to the configuration in which the fourth case member CS4 is fixed to the radially projecting portion 21 formed on the inner peripheral surface of the peripheral wall of the second case member CS2. However, the present disclosure is not limited to this. The fourth case member CS4 may be formed integrally with the second case member CS2.

(6) The above embodiment is described with respect to the configuration in which the shift shaft support portion 50 and the oil pump support portion 51 are formed as a single-piece member. However, embodiments of the present disclosure are not limited to this. The shift shaft support portion 50 and the oil pump support portion 51 may be formed by completely separate members and located at different positions in the axial direction.

(7) In the above embodiment, the pump chamber 60 of the mechanical oil pump MOP is formed in the first housing member 62 of the mechanical pump housing 61. However, embodiments of the present disclosure are not limited to this. The pump chamber 60 of the mechanical oil pump MOP may be formed to extend in both the first housing member 62 and the second housing member 63, or may be formed in the second housing member 63.

(8) In the above embodiment, the first fastening bolt 67 and the second fastening bolt 68 are separate bolts. However, a single common fastening bolt may be inserted through the pump housing through hole 100 from one of the axial first direction X1 side and the axial second direction X2 side and may be tightened by a nut on the other of the axial first direction X1 side and the axial second direction X2 side. For example, a common fastening bolt may be inserted through the pump housing through hole 100 from the axial first direction X1 side toward the axial second direction X2 side and may be tightened by a nut on the axial second direction side of the rotor accommodating member 77 so as to fasten the oil pump support portion 51, the first housing member 62, the second housing member 63, and the rotor accommodating member 77 together.

(9) The above embodiment is described with respect to the configuration in which a part of the plurality of fastening bolt holes formed to open toward the second coupling surface P2 side of the second housing member 63 and a part of the plurality of fastening bolt holes formed to open toward the second attachment surface F2 side of the second housing member 63 are the common fastening hole 95 extending through the second housing member 63 in the axial direction. That is, a part of the plurality of first fastening bolts 67 and a part of the plurality of second fastening bolts 68 are inserted in the common fastening hole 95. However, embodiments of the present are not limited to this. For example, all of the plurality of fastening bolt holes formed to open toward the second coupling surface P2 side of the second housing member 63 and the plurality of fastening bolt holes formed to open toward the second attachment surface F2 side of the second housing member 63 may be the common fastening holes 95, and all of the first fastening bolts 67 and the second fastening bolts 68 may be tightened in the common fastening holes 95. Alternatively, none of the plurality of fastening bolt holes formed to open toward the second coupling surface P2 side of the second housing member 63 and the plurality of fastening bolt holes formed to open toward the second attachment surface F2 side of the second housing member 63 may be the common fastening hole 95, namely the second housing member 63 may not have the common fastening hole 95, and the first fastening bolts 67 and the second fastening bolts 68 may be tightened in different fastening holes.

Figure 6:
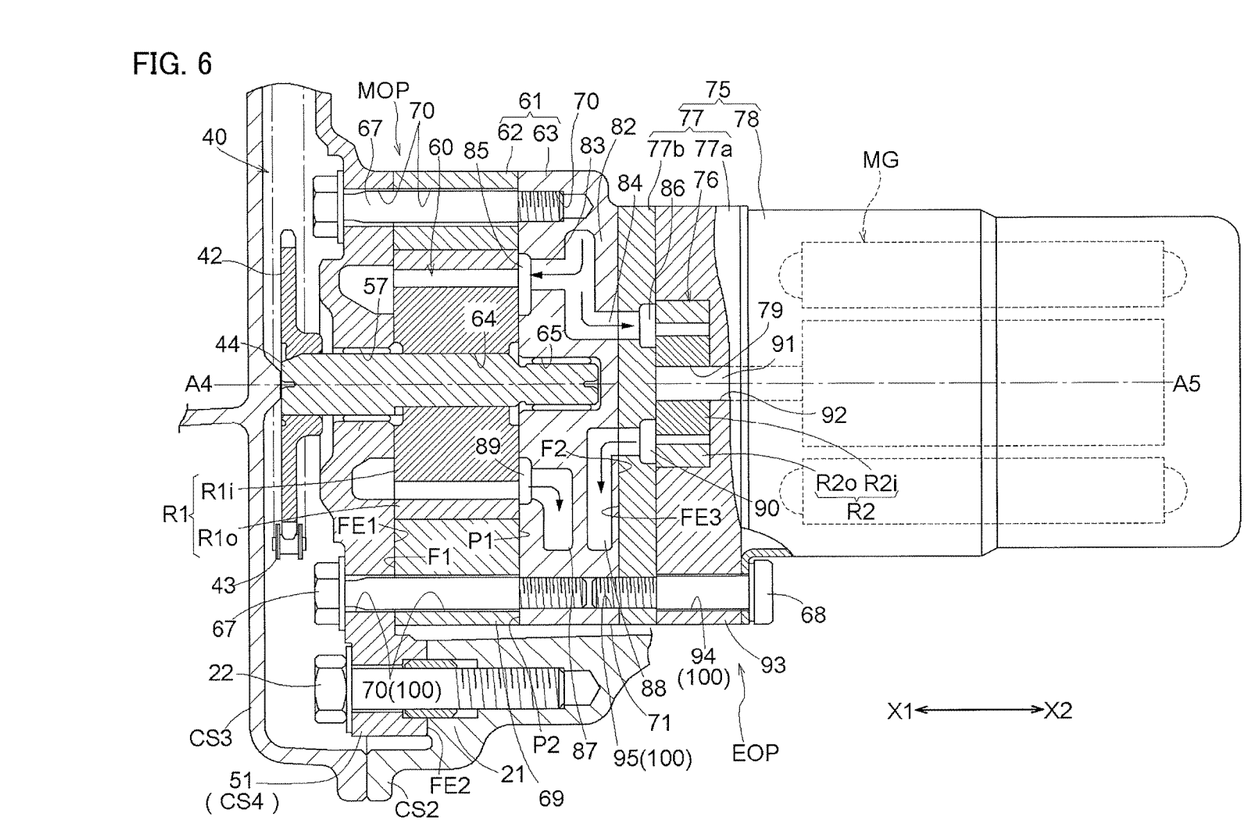
FIG. 6 is an axial sectional view of a mechanical oil pump and an electric oil pump according to another embodiment of the present disclosure.

(10) The above embodiment is described with respect to an example in which the rotor accommodating member 77 is formed by a single member and the second suction port 86 and the second discharge port 90 are formed in the second housing member 63 of the mechanical pump housing 61. However, embodiments of the present disclosure are not limited to this. For example, as shown in FIG. 6, the rotor accommodating member 77 may be formed by two members, namely a first rotor accommodating member 77a and a second rotor accommodating member 77b. In this case, the pump chamber 76 may be formed in the first rotor accommodating member 77a, and the second suction port 86 and the second discharge port 90 may be formed in the second rotor accommodating member 77b.

Figure 7:
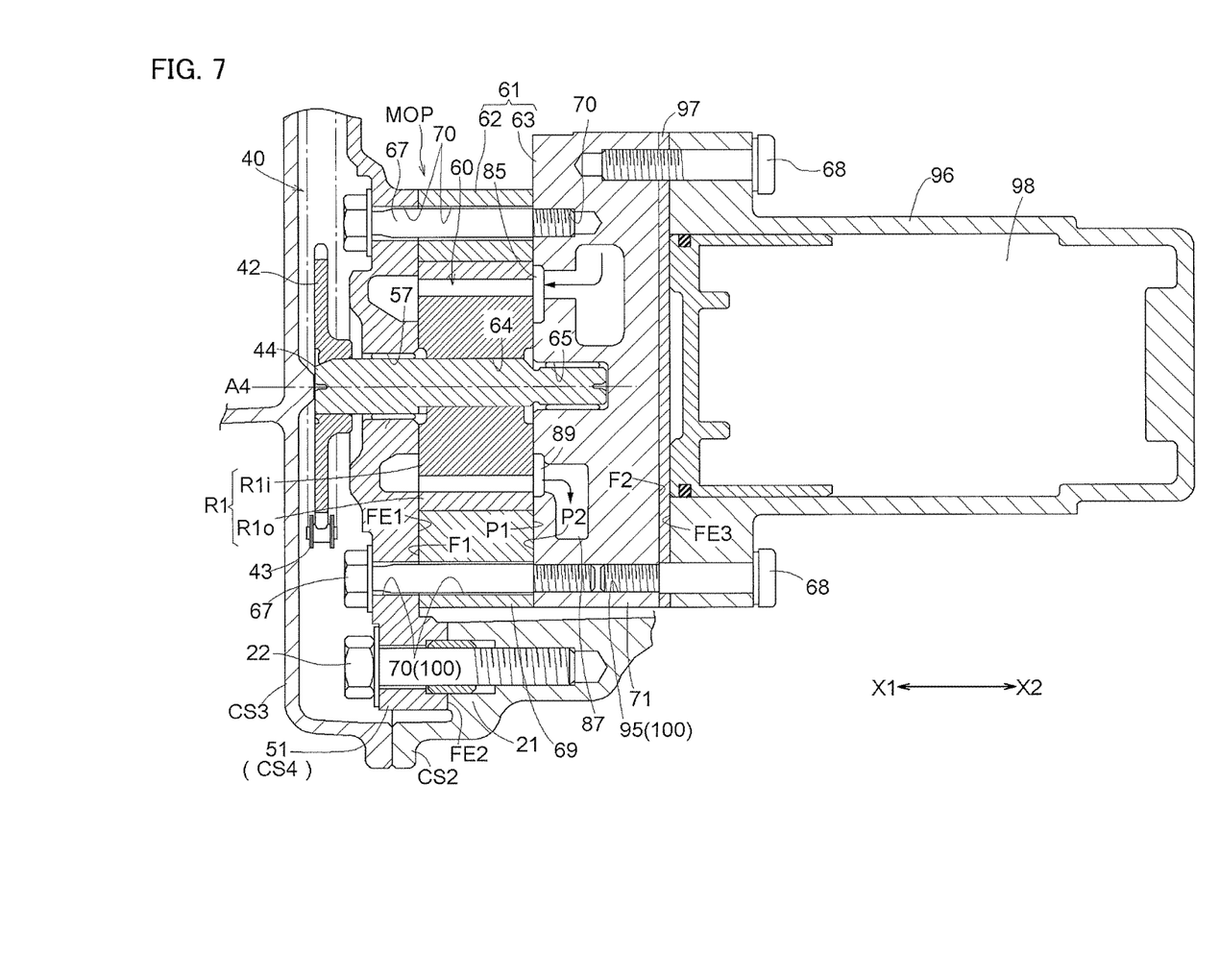
FIG. 7 is an axial sectional view of a mechanical oil pump and an auxiliary oil pressure source according to still another embodiment of the present disclosure.

(11) The above embodiment is described with respect to an example in which the auxiliary oil pressure source is the electric oil pump EOP. However, embodiments of the present disclosure are not limited to this. The auxiliary oil pressure source may be an electromagnetic pump that is driven by an electromagnetic actuator, or an accumulator. Even in this case, as shown in FIG. 7, an auxiliary oil pressure source housing 96 accommodating the electromagnetic pump or the accumulator is attached to the mechanical pump housing 61. The electromagnetic pump or the accumulator is accommodated in an accommodating space 98 formed in the auxiliary oil pressure source housing 96 (not shown). The electromagnetic pump is an oil pump that sucks oil from a suction port and discharges the oil to a discharge port by the driving force of the electromagnetic actuator. A pump that repeatedly sucks and discharges oil by reciprocating motion of a plunger (piston) which is caused by an electromagnetic force, etc. can be used as such an electromagnetic pump. Like the second discharge oil passage 88 for the electric oil pump EOP of the above embodiment, a discharge oil passage through which oil discharged from the discharge port of the electromagnetic pump flows is formed in the mechanical pump housing 61 (the second housing member 63), and oil is supplied from the discharge oil passage to the hydraulic control device 81 (not shown). Like the first suction oil passage 83 for the electric oil pump EOP of the above embodiment, a suction oil passage that supplies oil to the suction port of the electromagnetic pump is formed in the mechanical pump housing 61 (the second housing member 63), and oil is supplied from the strainer 80 to the suction oil passage (not shown). The accumulator is a hydraulic accumulator that stores an oil pressure generated by the mechanical oil pump MOP and discharges the stored oil pressure toward the hydraulic control device 81 side as necessary. Like the second discharge oil passage 88 for the electric oil pump EOP of the above embodiment, a discharge oil passage through which oil discharged from the accumulator flows is formed in the mechanical pump housing 61 (the second housing member 63), and oil is supplied from the discharge oil passage to the hydraulic control device 81 (not shown). A suction oil passage that supplies oil to the accumulator is formed in the mechanical pump housing 61 (the second housing member 63), and oil is supplied from the first discharge oil passage 87 of the mechanical oil pump MOP to the suction oil passage (not shown).

In this case, the mechanical pump housing 61 may be attached to the case CS such that the first attachment surface F1 of the mechanical pump housing 61 contacts the wall in the case CS, and the auxiliary oil pressure source housing 96 may be attached to the mechanical pump housing 61 such that the third surface FE3 of the auxiliary oil pressure source housing 96 which faces the axial first direction X1 side contacts the second attachment surface F2 of the mechanical pump housing 61. In the example shown in FIG. 7, a plate-like seal member 97 (e.g., a gasket) is interposed between the second attachment surface F2 of the mechanical pump housing 61 and the third surface FE3 of the auxiliary oil pressure source housing 96. The auxiliary oil pressure source housing 96 and the second housing member 63 may be fastened and fixed to each other by the second fastening bolt 68 inserted in the auxiliary oil pressure source housing 96 and the second housing member 63 from the axial second direction X2 side toward the axial first direction X1 side. A plurality of the second fastening bolts 68 may be provided, and at least a part of the plurality of first fastening bolts 67 and at least a part of the plurality of second fastening bolts 68 may be placed coaxially with each other, and the first fastening bolt 67 and the second fastening bolt 68 which are placed coaxially with each other may be tightened in the common fastening hole 95.

(12) It should be understood that regarding other configurations as well, the embodiments disclosed in the specification are by way of example only in all respects, and the scope of the present disclosure is not limited by these embodiments. It will be readily understood that those skilled in the art can modify the disclosure as appropriate without departing from the spirit and scope of the disclosure. Naturally, other embodiments obtained by modifying the disclosure without departing from the spirit and scope of the disclosure are included in the present disclosure.

INDUSTRIAL APPLICABILITY

The present disclosure can be preferably used in vehicle drive devices including a mechanical oil pump that is driven by a driving force source for wheels, an auxiliary oil pressure source, and a driving force transmission mechanism that transmits a driving force between the driving force source and the wheels, and a case that accommodates at least the driving force transmission mechanism.

The invention claimed is:

1. A vehicle drive device comprising:
a mechanical oil pump that is driven by a driving force source for a wheel;
an auxiliary oil pressure source;
a driving force transmission mechanism that transmits a driving force between the driving force source and the wheel; and
a case that accommodates at least the driving force transmission mechanism, wherein
the mechanical oil pump includes a mechanical pump rotor and a mechanical pump housing forming a pump chamber that accommodates the mechanical pump rotor,
the auxiliary oil pressure source includes an auxiliary oil pressure generation mechanism that generates an auxiliary oil pressure, and an auxiliary oil pressure source housing that accommodates the auxiliary oil pressure generation mechanism,
the mechanical pump housing is attached to a wall in the case, and
the auxiliary oil pressure source housing is attached to the mechanical pump housing, wherein
the mechanical pump housing includes a first attachment surface that faces an axial first direction side or one side in an axial direction of a mechanical pump axis as a rotation axis of the mechanical pump rotor, and a second attachment surface that faces an axial second direction side in an opposite direction to the axial first direction, and
the mechanical pump housing is attached to the case such that the first attachment surface contacts the wall, and the auxiliary oil pressure source housing is attached to the mechanical pump housing such that the auxiliary oil pressure source housing contacts the second attachment surface.

2. The vehicle drive device according to claim 1, wherein the mechanical pump housing has a first housing member and a second housing member which are stacked in this order from the first attachment surface side toward the axial second direction side,
the first housing member and the second housing member are fastened and fixed to each other by a first fastening bolt inserted in the first housing member and the second housing member from the axial first direction side toward the axial second direction side, and
the auxiliary oil pressure source housing and the second housing member are fastened and fixed to each other by a second fastening bolt inserted in the auxiliary oil pressure source housing and the second housing member from the axial second direction side toward the axial first direction side.

3. The vehicle drive device according to claim 2, wherein a plurality of the first fastening bolts and a plurality of the second fastening bolts are provided,
the second housing member has a common fastening hole extending therethrough in the axial direction,
at least a part of the plurality of the first fastening bolts and at least a part of the plurality of the second fastening bolts are placed coaxially with each other, and the first fastening bolt and the second fastening bolt which are placed coaxially with each other are tightened in the common fastening hole.

4. The vehicle drive device according to claim 3, wherein the auxiliary oil pressure source is an electric oil pump that is driven by a pump rotating electrical machine, an electromagnetic pump that is driven by an electromagnetic actuator, or an accumulator.

5. The vehicle drive device according to claim 4, wherein the auxiliary oil pressure source is an electric oil pump that is driven by a pump rotating electrical machine,
the electric oil pump includes an electric pump rotor as the auxiliary oil pressure generation mechanism and an electric pump housing as the auxiliary oil pressure source housing forming a pump chamber that accommodates the electric pump rotor, and
an electric pump axis as a rotation axis of the electric pump rotor is located parallel to a mechanical pump axis as a rotation axis of the mechanical pump rotor.

6. The vehicle drive device according to claim 3, wherein the auxiliary oil pressure source is an electric oil pump that is driven by a pump rotating electrical machine,
the electric oil pump includes an electric pump rotor as the auxiliary oil pressure generation mechanism and an electric pump housing as the auxiliary oil pressure source housing forming a pump chamber that accommodates the electric pump rotor, and
an electric pump axis as a rotation axis of the electric pump rotor is located parallel to a mechanical pump axis as a rotation axis of the mechanical pump rotor.

7. The vehicle drive device according to claim 3, wherein the auxiliary oil pressure source is an electric oil pump that is driven by a pump rotating electrical machine,
the electric oil pump includes an electric pump rotor as the auxiliary oil pressure generation mechanism and an electric pump housing as the auxiliary oil pressure source housing forming a pump chamber that accommodates the electric pump rotor, and
the second housing member has a first suction oil passage connecting a suction port of the mechanical oil pump to a strainer, and a second suction oil passage connecting a suction port of the electric oil pump to the strainer.

8. The vehicle drive device according to claim 2, wherein the auxiliary oil pressure source is an electric oil pump that is driven by a pump rotating electrical machine, an electromagnetic pump that is driven by an electromagnetic actuator, or an accumulator.

9. The vehicle drive device according to claim 8, wherein the auxiliary oil pressure source is an electric oil pump that is driven by a pump rotating electrical machine,
the electric oil pump includes an electric pump rotor as the auxiliary oil pressure generation mechanism and an electric pump housing as the auxiliary oil pressure source housing forming a pump chamber that accommodates the electric pump rotor, and
an electric pump axis as a rotation axis of the electric pump rotor is located parallel to a mechanical pump axis as a rotation axis of the mechanical pump rotor.

10. The vehicle drive device according to claim 2, wherein
the auxiliary oil pressure source is an electric oil pump that is driven by a pump rotating electrical machine,
the electric oil pump includes an electric pump rotor as the auxiliary oil pressure generation mechanism and an electric pump housing as the auxiliary oil pressure source housing forming a pump chamber that accommodates the electric pump rotor, and an electric pump axis as a rotation axis of the electric pump rotor is located parallel to a mechanical pump axis as a rotation axis of the mechanical pump rotor.

11. The vehicle drive device according to claim 2, wherein
the auxiliary oil pressure source is an electric oil pump that is driven by a pump rotating electrical machine,
the electric oil pump includes an electric pump rotor as the auxiliary oil pressure generation mechanism and an electric pump housing as the auxiliary oil pressure source housing forming a pump chamber that accommodates the electric pump rotor, and
the second housing member has a first suction oil passage connecting a suction port of the mechanical oil pump to a strainer, and a second suction oil passage connecting a suction port of the electric oil pump to the strainer.

12. The vehicle drive device according to claim 1, wherein
the auxiliary oil pressure source is an electric oil pump that is driven by a pump rotating electrical machine, an electromagnetic pump that is driven by an electromagnetic actuator, or an accumulator.

13. The vehicle drive device according to claim 12, wherein
the auxiliary oil pressure source is an electric oil pump that is driven by a pump rotating electrical machine,
the electric oil pump includes an electric pump rotor as the auxiliary oil pressure generation mechanism and an electric pump housing as the auxiliary oil pressure source housing forming a pump chamber that accommodates the electric pump rotor, and
an electric pump axis as a rotation axis of the electric pump rotor is located parallel to a mechanical pump axis as a rotation axis of the mechanical pump rotor.

14. The vehicle drive device according to claim 1, wherein
the auxiliary oil pressure source is an electric oil pump that is driven by a pump rotating electrical machine,
the electric oil pump includes an electric pump rotor as the auxiliary oil pressure generation mechanism and an electric pump housing as the auxiliary oil pressure source housing forming a pump chamber that accommodates the electric pump rotor, and
an electric pump axis as a rotation axis of the electric pump rotor is located parallel to a mechanical pump axis as a rotation axis of the mechanical pump rotor.

* * * * *